(12) United States Patent
Wicklund

(10) Patent No.: US 8,656,131 B2
(45) Date of Patent: Feb. 18, 2014

(54) METHOD AND APPARATUS FOR EXPANDING A VIRTUAL STORAGE DEVICE

(75) Inventor: Thomas George Wicklund, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 500 days.

(21) Appl. No.: 12/363,870

(22) Filed: Feb. 2, 2009

(65) Prior Publication Data

US 2010/0115210 A1 May 6, 2010

Related U.S. Application Data

(60) Provisional application No. 61/110,298, filed on Oct. 31, 2008.

(51) Int. Cl.
*G06F 13/00* (2006.01)
*G06F 9/26* (2006.01)
*G06F 9/34* (2006.01)
*G06F 12/00* (2006.01)

(52) U.S. Cl.
USPC ............ 711/170; 711/209; 711/165; 711/114

(58) Field of Classification Search
USPC .......................................................... 711/170
See application file for complete search history.

(56) References Cited

U.S. PATENT DOCUMENTS

| | | | |
|---|---|---|---|
| 4,092,732 A | 5/1978 | Ouchi | |
| 5,502,836 A | 3/1996 | Hale et al. | |
| 5,758,118 A | 5/1998 | Choy et al. | |
| 5,875,456 A | 2/1999 | Stallmo et al. | |
| 6,279,138 B1 | 8/2001 | Jadav et al. | |
| 6,530,004 B1 | 3/2003 | King et al. | |
| 6,654,831 B1 | 11/2003 | Otterness et al. | |
| 6,901,480 B2 * | 5/2005 | Don et al. | 711/114 |
| 7,032,086 B2 * | 4/2006 | Merchant | 711/156 |
| 7,111,117 B2 | 9/2006 | Franklin et al. | |
| 7,133,965 B2 | 11/2006 | Chien | |
| 7,254,754 B2 | 8/2007 | Hetzler et al. | |
| 7,277,995 B2 | 10/2007 | Davies et al. | |
| 7,281,177 B2 | 10/2007 | Hetzler et al. | |
| 7,412,569 B2 * | 8/2008 | Naveh et al. | 711/144 |
| 2004/0133743 A1 * | 7/2004 | Ito et al. | 711/114 |
| 2005/0132134 A1 | 6/2005 | Chien | |
| 2005/0132135 A1 | 6/2005 | Chien | |
| 2006/0253766 A1 | 11/2006 | Winarski et al. | |
| 2007/0011401 A1 | 1/2007 | Zhang et al. | |
| 2008/0091916 A1 * | 4/2008 | Hashemi | 711/209 |

* cited by examiner

*Primary Examiner* — Reginald Bragdon
*Assistant Examiner* — Stella Eun
(74) *Attorney, Agent, or Firm* — Thomas J. Lavan; Bradley M. Knepper

(57) ABSTRACT

The present invention provides for the expansion of a virtual storage device. Expansion of the virtual storage device includes adding one or more additional storage device units to an existing virtual storage device. Blocks or strips included in an added storage device unit are assigned addresses, to allow the added storage capacity to be accessed immediately. In order to reestablish a pattern of data storage addresses from the original storage device units of the pre-expanded virtual storage device across all of the storage device units of the post-expanded virtual storage device, temporary storage is provided. In particular, as a strip of data is relocated to its proper post-expand location, the data occupying that location is placed in a temporary storage buffer. Data in the temporary storage buffer is then written to the proper post-expand location for that data, with displaced data being written to a second temporary storage buffer.

18 Claims, 15 Drawing Sheets

408

| Stripe | Drive # | | |
|---|---|---|---|
| | D0 | D1 | D2 |
| 0 | 0 | 1 | 8 |
| 1 | [2] | 3 | 9 |
| 2 | 4 | 5 | 10 |
| 3 | 6 | 7 | 11 |

Buffer A = [2] — *324a*
Buffer B = 8 — *324b*

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 0 | 0 | 0 | 0 | 0 | 0 | 1 |

*Fig. 13D*

| Stripe | Drive # | | | — 124 |
|---|---|---|---|---|
| | D0 | D1 | D2 | |
| 0 | 0 | 1 | 2 | |
| 1 | [2] | 3 | 9 | |
| 2 | 4 | 5 | 8 | |
| 3 | 6 | 7 | 11 | |

Buffer A = 10 — *324a*
Buffer B = [8] — *324b*

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 0 | 0 | 0 | 1 | 0 | 0 | 1 |

*Fig. 13E*

| Stripe | Drive # | | | — 124 |
|---|---|---|---|---|
| | D0 | D1 | D2 | |
| 0 | 0 | 1 | 2 | |
| 1 | [2] | 3 | 9 | |
| 2 | 4 | 5 | 8 | |
| 3 | 6 | 10 | 11 | |

Buffer A = [10] — *324a*
Buffer B = 7 — *324b*

— 404

| Strip | 0 | 1 | 2 | 3 | 4 | 5 | 6 | 7 | 8 | 9 | 10 | 11 | — 326 |
|---|---|---|---|---|---|---|---|---|---|---|---|---|---|
| Status Value | 1 | 1 | 1 | 0 | 0 | 0 | 0 | 0 | 1 | 0 | 1 | 1 | |

| Stripe | Drive # 124 | | |
|---|---|---|---|
| | D0 | D1 | D2 |
| 0 | 0 | 1 | 2 |
| 1 | [2] | 3 | 9 |
| 2 | 4 | 7 | 8 |
| 3 | 6 | 10 | 11 |

Buffer A = 5 — 324a
Buffer B = [7] — 324b

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 0 | 0 | 1 | 1 | 0 | 1 | 1 |

| Stripe | Drive # 124 | | |
|---|---|---|---|
| | D0 | D1 | D2 |
| 0 | 0 | 1 | 2 |
| 1 | [2] | 3 | 5 |
| 2 | 4 | 7 | 8 |
| 3 | 6 | 10 | 11 |

404

Buffer A = [5] — 324a
Buffer B = 9 — 324b

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 1 | 0 | 1 | 1 | 0 | 1 | 1 |

| Stripe | Drive # | | |
|---|---|---|---|
| | D0 | D1 | D2 |
| 0 | 0 | 1 | 2 |
| 1 | [2] | 3 | 5 |
| 2 | 4 | 7 | 8 |
| 3 | 9 | 10 | 11 |

Buffer A = 6 — 324a
Buffer B = [9] — 324b

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 1 | 0 | 1 | 1 | 1 | 1 | 1 |

326

128

| Stripe | Drive # | | | | 
|---|---|---|---|---|
| | D0 | D1 | D2 | D3 |
| 0 | 0 | 1 | 2 | P |
| 1 | [2] | P | 3 | 9 |
| 2 | 4 | P | 5 | 8 |
| 3 | P | 6 | 10 | 11 |

| New parity? | — 330 |
|---|---|
| 1 | |
| 0 | |
| 1 | |
| 1 | |

Buffer A = [10]
Buffer B = 7

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 0 | 0 | 0 | 1 | 0 | 1 | 1 |

| Stripe | Drive # | | | |
|---|---|---|---|---|
| | D0 | D1 | D2 | D3 |
| 0 | 0 | 1 | 2 | P |
| 1 | [2] | P | 3 | 9 |
| 2 | 4 | P | 7 | 8 |
| 3 | P | 6 | 10 | 11 |

| New parity? |
|---|
| 1 |
| 0 |
| 1 |
| 1 |

Buffer A = 5
Buffer B = [7]

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 0 | 0 | 1 | 1 | 0 | 1 | 1 |

| Stripe | Drive # | | | |
|---|---|---|---|---|
| | D0 | D1 | D2 | D3 |
| 0 | 0 | 1 | 2 | P |
| 1 | [2] | 3 | P | 5 |
| 2 | 4 | P | 7 | 8 |
| 3 | P | 6 | 10 | 11 |

— 716
— 408

| New parity? |
|---|
| 1 |
| 1 |
| 1 |
| 1 |

Buffer A = [5]
Buffer B = 9

| Strip | 0 | 1 | 2 | 3 | 4 | 5 | 6 | 7 | 8 | 9 | 10 | 11 |
|---|---|---|---|---|---|---|---|---|---|---|---|---|
| Status Value | 1 | 1 | 1 | 0 | 0 | 1 | 0 | 1 | 1 | 0 | 1 | 1 |

*Fig. 14F*

METHOD AND APPARATUS FOR EXPANDING A VIRTUAL STORAGE DEVICE

CROSS REFERENCE TO RELATED APPLICATIONS

This application claims the benefit of U.S. Provisional Patent Application Ser. No. 61/110,298, filed Oct. 31, 2008, the entire disclosure of which is hereby incorporated herein by reference.

FIELD

The present invention is directed to providing an expandable virtual storage device. In particular, the present invention is directed to providing a virtual storage device that allows for immediate access to additional storage capacity.

BACKGROUND

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access time and/or data transfer rate. Examples of systems that can provide such benefits can be found in the various RAID (redundant array of independent disks) levels that have been developed.

Where a data storage system incorporates a number of physical storage devices, additional capacity can be added by adding additional physical storage devices. However, integrating the additional storage provided by adding an additional storage device has been problematic. For example, the data strips available on the added storage device unit could simply be appended to the preexisting data storage device units by numbering the newly added strips in sequence, without integrating the addressing with the pattern established on the original or preexisting data storage device units. As a result the logical addresses associated with the strips of data storage provided by the new storage device will usually fail to conform to the pattern of data distribution established on the pre-existing data storage devices. Because the data is no longer striped across the individual storage devices in the desired pattern, the performance of the storage device is adversely affected. Also, in a data storage system that stores parity information, new parity information will typically need to be generated after a new data storage device is added to the system.

In order to add additional storage devices to a RAID array, while preserving the performance of the array, the distribution of data can be reordered so that the data is striped across all of the physical storage devices in the desired pattern. This requires that the availability of the added storage capacity be delayed until after the desired distribution of data across all of the physical storage device units of the expanded virtual storage device has been completed. However, because such re-striping of a data storage system involves moving most of the data in the data storage system to a new location, the process is extremely time-consuming. Moreover, this can have a significant impact on the end user, as access to the newly-added storage is not available until the re-striping operation has been completed.

SUMMARY

In accordance with embodiments of the present invention, methods and apparatuses are provided that allow a virtual storage device comprising a number of physical storage devices to be expanded, while allowing for immediate access to the newly added capacity. Embodiments of the present invention achieve this by providing for the temporary storage of data in memory. In addition, embodiments of the present invention incorporate a data moved array to track whether data within a virtual storage device comprising a plurality of physical storage devices, also referred to herein as storage device units, has been relocated and/or occupies the desired location within the virtual storage device.

Methods in accordance with embodiments of the present invention allow access to all of the data storage capacity of a virtual storage device. In accordance with embodiments of the present invention, access is available immediately after adding storage capacity to the virtual storage device, without first requiring the completion of the reordering of the data stored in the virtual storage device. In particular, immediately after adding additional storage, strips on the original data storage devices remain addressed according to an initial mapping function. As can be appreciated by one of skill in the art, a strip is a unit of data that contains one or more blocks of data. In general, the initial mapping function reflects a desired distribution of data across the original storage devices, and typically implements one of the known RAID levels using the original storage devices. The method further includes addressing the strips provided by one or more newly added storage devices according to a new storage device mapping function. Because addresses are immediately assigned to the newly added storage devices, access to the newly added storage is immediately available.

A data moved array is provided for tracking the status of strips of data included in the expanded virtual storage device. In particular, a first value is assigned to strips of data storage that need to be relocated in order to implement the desired RAID level or distribution of data across the strips provided by the physical data storage devices included in the virtual storage device. A second value is assigned to those strips of data that do not need to be relocated.

The data moved array is kept in memory available to the process managing the virtual storage device. Because the data moved array can be large relative to the amount of memory available to the data storage system, the data moved array may kept in any combination of memory and storage device space available to the data storage system. This might include memory available to a controller, cache or buffer memory, physical storage device space, or a portion of a virtual storage device. In particular, a portion of the space made available by expanding a virtual storage device may be used to hold the data moved array until the expand process completes.

After all elements of the data moved array have been set to their proper value, a first strip having a first status value indicating that the strip must be relocated is identified. The destination location of the identified strip within the array of storage devices is determined by applying the logical address of the identified strip to a final mapping function. The strip of data occupying the location identified as the source for the first strip is written to a first temporary storage buffer, and the strip of data occupying the location identified as the source for the second strip is written to a second temporary storage buffer. The first strip of data is then moved to its destination location, and the status value for the first strip in the data moved array is changed to the second value, indicating that the strip of data is now in the proper post expand location. Next, the destination location for the strip of data held in the second temporary storage buffer (the second strip of data) is determined by applying the logical address for that data to the final mapping function. A third strip of data, which is the strip of data occupying the destination location for the second strip of data is written to the first temporary storage buffer. The second strip of data is then written from the second temporary storage buffer to its post-expand location. The data moved array is then updated to indicate that the second strip of data is now in its proper post-expand location. The destination location for the third strip of data is then determined, the data occupying that location is written to the second temporary storage buffer, and the third strip of data is written to its proper post-expand location. This process continues until all of the strips of data storage available in the virtual storage device occupy their proper post-expand location.

In accordance with embodiments of the present invention, expansion of a virtual storage device can also be applied to virtual storage devices implementing RAID schemes that incorporate parity or other redundancy information. According to such embodiments, a redundancy information array (e.g., a parity coverage array) is maintained for tracking whether parity data or other redundancy information in an expanded virtual storage device applies to all of the strips in a stripe of an expanded virtual storage device, or whether the parity data for a stripe applies only to the strips included in the original storage devices. Similar to the data moved array, the redundancy information array may be kept in memory or use available storage device space. According to embodiments of the present invention, parity is generated for all stripes of the expanded storage array, as determined by the parity distribution arrangement for the RAID level being implemented and the stripe within the virtual storage device to which it pertains, the first time data is written to any strip of the stripe after the expand process begins. This includes both host data writes and writes as part of the expand process.

Embodiments of the present invention may incorporate control and mapping functions that are implemented as part of the operation of a data storage system controller. In addition, space for storing the various arrays used for tracking the status of strips of data and the temporary storage buffers may be provided by memory included in or associated with a data storage system controller, by an existing virtual storage device or auxiliary storage device unit or units that are part of the data storage system, or by a portion of the virtual storage device being expanded.

Additional features and advantages of embodiments of the described invention will become more readily apparent from the following description, particularly when taken together with the accompanying drawings.

BRIEF DESCRIPTION OF THE DRAWINGS

FIGS. 13A-13L illustrate the mapping of an example virtual storage device at different points during the process of restriping the expanded virtual storage device in accordance with embodiments of the present invention; and FIGS. 14A-14F illustrate the mapping of an example virtual storage device incorporating parity data at different points during the process of restriping the expanded virtual storage device in accordance with embodiments of the present invention.

DETAILED DESCRIPTION

Figure 1:
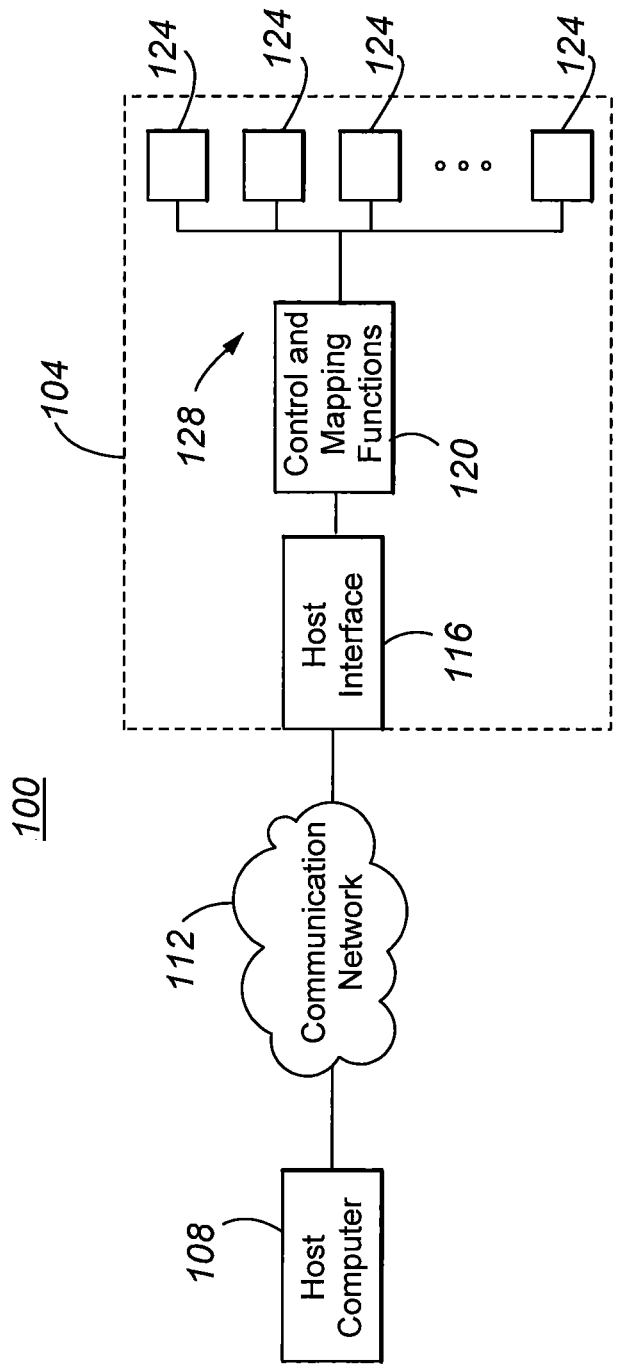
FIG. 1 is a functional block diagram of an electronic data system incorporating a data storage system in accordance with embodiments of the present invention.

FIG. 1 is a block diagram depicting an electronic data system 100 incorporating a data storage system 104 in accordance with embodiments of the present invention. In general, the data storage system 104 may be interconnected to one or more host processors or computers 108 by a bus and/or network 112. Accordingly, embodiments of the present invention have applications in association with single or multiple host 108 Storage Area Network (SAN) or direct connect environments. In accordance with still other embodiments, a data storage system 104 may be integrated with or directly connected to a host 108. An electronic data system 100 may also include multiple data storage systems 104.

The data storage system 104 generally includes a host interface 116, control and mapping functions 120, and a plurality of storage device units 124. In accordance with embodiments of the present invention, the data storage system 104 comprises a virtual storage device 128. The virtual storage device 128 may comprise a redundant array of independent disks (RAID) set or array.

Figure 2:
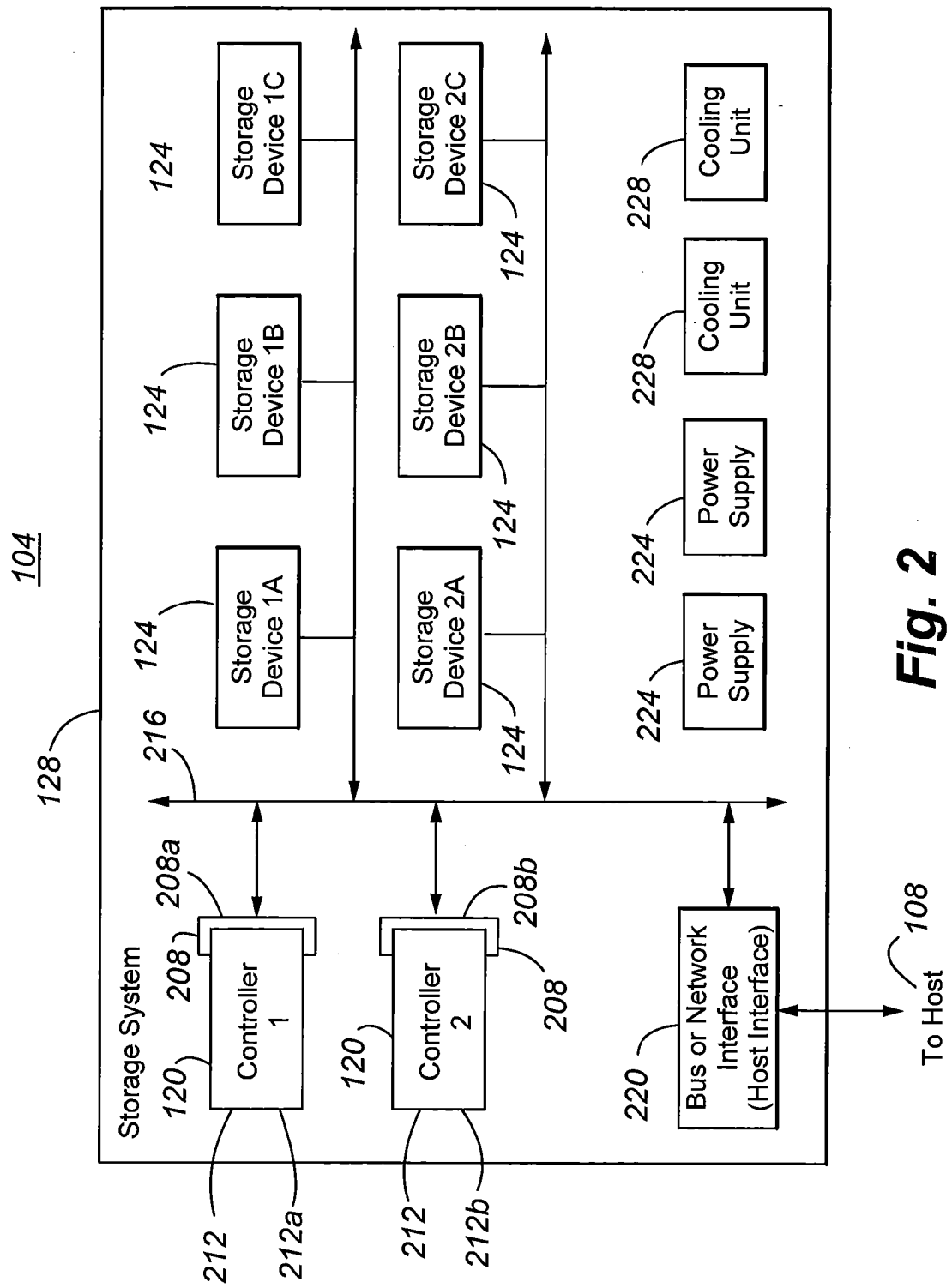
FIG. 2 is a block diagram depicting components of a data storage system in accordance with embodiments of the present invention.

FIG. 2 illustrates in greater detail components that may be included in a data storage system 104 comprising a virtual storage device 128 in accordance with embodiments of the present invention. In general, the data storage system 104 includes a number of physical storage devices or storage device units 124. The storage device units 124 may, for purposes of illustration and without necessarily limiting the claims, comprise hard disk drives, such as serial advanced technology attachment (SATA), small computer system interface (SCSI), serial attached SCSI (SAS), fiber channel (FC), or parallel advanced technology attached (PATA) hard disk drives. Furthermore, although a number of storage device units 124 are illustrated, it should be appreciated that embodiments of the present invention are not limited to any particular number of storage devices 124, and that a lesser or greater number of storage devices 124 may be provided as part of a data storage system 104. As can be appreciated by one of skill in the art, virtual storage devices may be established on the storage device units 124. As can further be appreciated by one skilled in the art, a virtual storage device may be implemented in accordance with any one of the various RAID array levels or other arrangements for storing data across a plurality of storage device units 124.

A data storage system 104 may be provided with a first controller slot 208*a*. In addition, embodiments may include additional controller slots, such as a second controller slot 208*b*. A controller slot 208 may comprise a connection or set of connections to enable a controller 212 to be operably interconnected to other components of the data storage system 104. Furthermore, a data storage system 104 in accordance with embodiments of the present invention includes at least one controller 212. For example, if the data storage system 104 is operated in a single controller, non-failover mode, the data storage system 104 may include exactly one controller 212. The data storage system 104 in accordance with other embodiments of the present invention may be operated in a dual redundant active-active controller mode by providing a second controller 212. When a second controller 212*b* is used in addition to a first controller 212*a*, the second controller 212*b* is received by a second controller slot 208*b*. As can be appreciated by one skilled in the art, the provision of two controllers, 212*a*-212*b*, permits data to be mirrored between the controllers 212*a*-212*b*, providing redundant active-active controller operation. One or more buses or channels 216 are generally provided to interconnect a controller or controllers 212 through the associated controller slot or slots 208 to the storage device units 124. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface, hereinafter referred to as a host interface 220, may be provided to interconnect the data storage system 104 to the bus or network 112 to enable interaction with a host computer 108.

Figure 3:
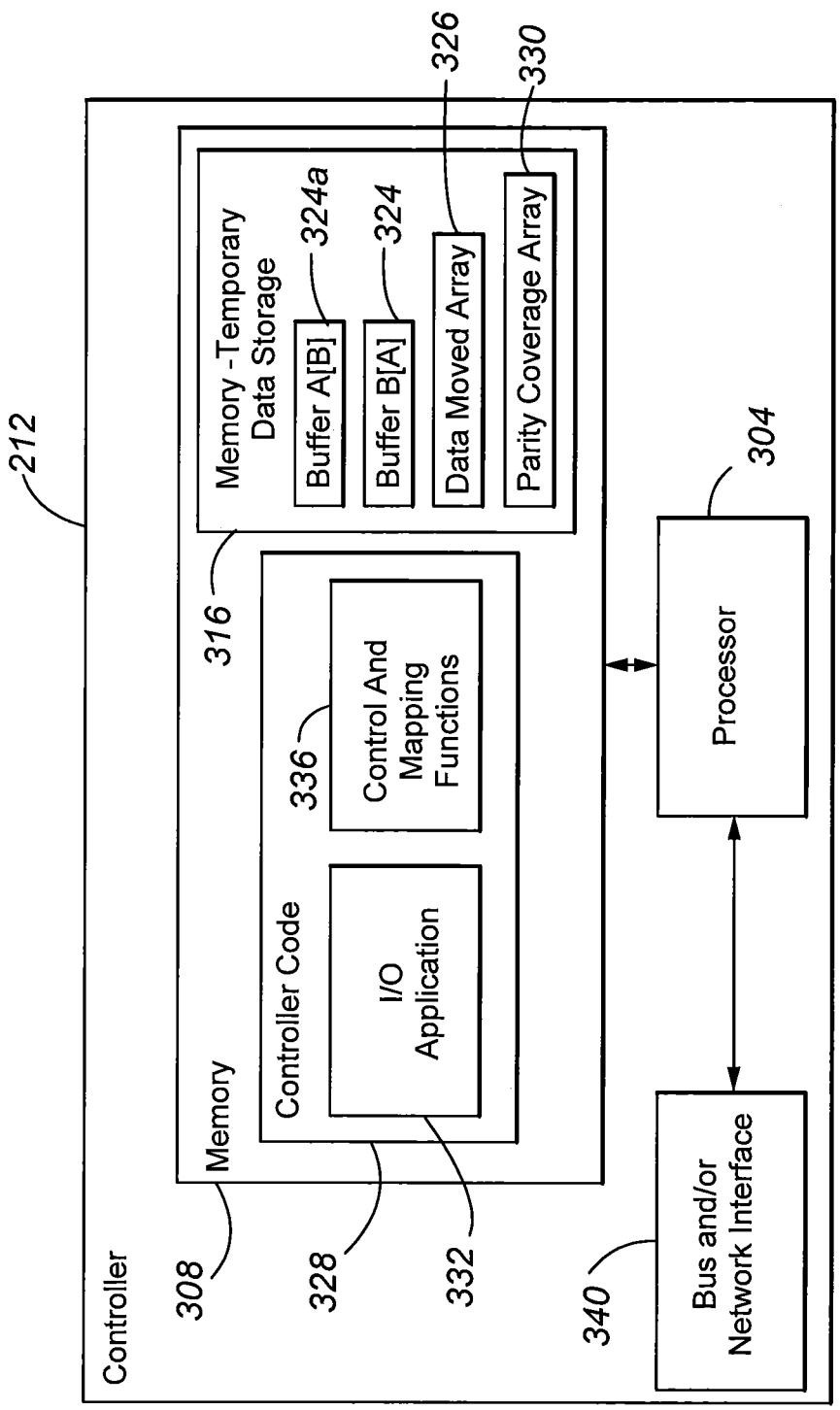
FIG. 3 is a block diagram depicting components of a controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and/or controlling various controller 212 functions. Such instructions may include the storage controller code 328 stored in memory 308 for implementing a data storage system 104 incorporating a virtual storage device 128 as described in the present disclosure. Furthermore, such instructions may be stored as software and/or firmware. As can be appreciated by one skilled in the art, operations concerning the generation of parity data or other operations may be performed using one or more hardwired and/or programmable logic circuits provided as part of the processor subsystem 304. Accordingly, the processor subsystem 304 may be implemented as a number of discreet components, such as one or more programmable processors in combination with one or more logic circuits. Processor subsystem 304 may also include or be implemented as one or more integrated devices or processors. For example, a processor subsystem 304 may comprise a complex programmable logic device (CPLD).

A controller 212 also generally includes memory 308. The memory 308 is not specifically limited to memory of any particular type. For example, the memory 308 may comprise a solid state memory device, or a number of solid state memory devices. In addition, the memory 308 may comprise different memory types, for example for use in connection with different functions. As an example, and without limiting the claims, the memory 308 may comprise separate volatile and non-volatile memory portions. In general, the memory 308 contains controller code 328 that is executable by the processor subsystem 304 in connection with the operation of the data storage system 104. More particularly, the controller code 328 may include one or more input/output (I/O) applications 332, for example to provide functionality with respect to the receipt and transmission of data between attached storage device units 124 and a host computer 108. The controller code 328 may also include control and mapping functions 336. These control and mapping functions may be provided to implement the virtual disk expansion and strip mapping features and functions provided by embodiments of the present invention.

In addition, the memory 308 may include memory for temporary data storage 316. This portion or component of the memory 308 may provide storage for temporary storage buffers 324, a data moved array 326, and a redundancy information array (e.g., a parity coverage array) 330. In accordance with embodiments of the present invention, the temporary storage buffers 324 comprise an A (or first) temporary storage buffer 324*a* and a B (or second) temporary storage buffer 324*b*. As can be appreciated by one of skill in the art, memory 308 provided as part of the controller 212 will typically also include a portion dedicated to operation as a write cache and a portion dedicated to operation as a read cache. As can also be appreciated by one of skill in the art, space in the memory 308 of a controller can be used to store data that has been mirrored to the controller by a partner controller in order to provide redundancy. The controller 212 also generally includes a bus or network interface 340 for interfacing with the other components of the data storage system 104.

Figure 4:
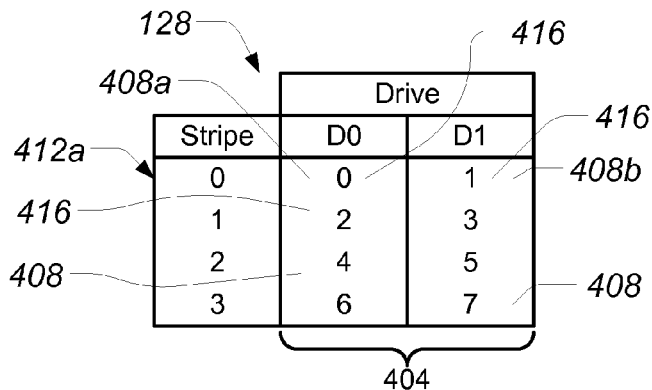
FIG. 4 is a graphical depiction of the mapping of a virtual storage device according to an initial mapping function, prior to expansion.

FIG. 4 is a graphical depiction of the mapping according to an initial mapping function 404 of strips 408 included in a virtual storage device 128 in accordance with embodiments of the present invention prior to expansion of the virtual storage device 128 by the addition of a new or additional storage device unit 124. As can be appreciated by one of skill in the art, a strip is a unit of data that contains one or more blocks. For simplicity, the examples and discussion provided in the present disclosure assume a strip size that is equal to one block. However, as will be apparent to one of ordinary skill in the art, the disclosed system and processor are equally applicable to systems in which each strip contains multiple blocks. As shown in FIG. 4, each of the storage device units 124, indicated as drives D0 and D1, contain a plurality of strips 408, numbered 0, 1, 2, 3 in the example. Together, one strip 408 from each of the storage unit devices 124 combine to form a stripe 412. For example, strip 408*a* of storage device unit D0 and strip 408*b* of storage unit device D1 combine to form a stripe 412*a* of the virtual storage device 128. In addition, FIG. 4 illustrates that each strip 408 of data in a storage device unit 124 is associated with a logical address 416. In accordance with embodiments of the present invention, the logical address 416 is the host address, or the address by which a host computer 108 recognizes data stored in the virtual storage device 128. Accordingly, the addresses of the strips proceed according to the mapping function used to define the distribution of data across the storage device units 124 of the virtual storage device 128 until the last strip available for storing data has been assigned an address.

As can be seen from the numbering of the strips 408, according to the example initial mapping function 404 in this example data is generally allocated to the virtual storage device 128 in a striped fashion (i.e. it implements a RAID 0 array). In order to increase the capacity of the virtual storage device, one or more additional physical storage device units 124 can be added. However, integration of the strips included in an additional physical storage device unit 124 with the original or preexisting storage device units 124 of the virtual storage device 128 is impossible while maintaining the pattern of data distribution established on the original storage device units 124, without relocating almost all of the data on the original or preexisting storage device units 124.

Figure 5:
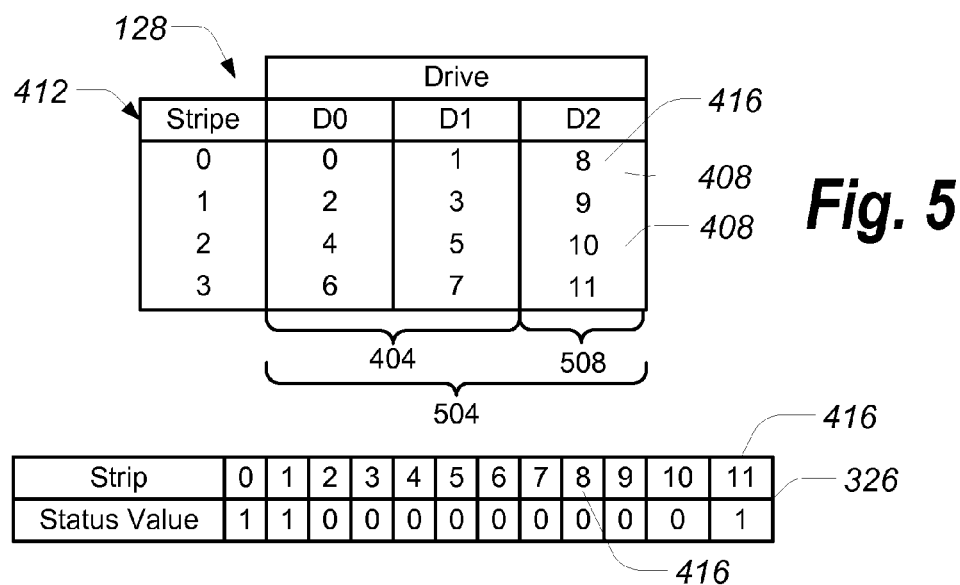
FIG. 5 is a graphical depiction of the mapping of a virtual storage device according to a first mapping function immediately following expansion of that device by the addition of an additional storage device unit.

In accordance with embodiments of the present invention, immediate access to storage on one or more data storage device units 124 that are added to create an expanded virtual storage device 128 is provided by initially assigning addresses 416 to the strips 408 of the newly added storage unit or units 124 in sequence. This arrangement is illustrated in FIG. 5, and is in conformance with a first mapping function 504 in which the data strips 408 of the original or preexisting data storage device units D0 and D1 124 are assigned according to the initial mapping function 404, while the data strips available on the new data storage device unit D2 124 are assigned according to a new disk mapping function 508. By assigning logical addresses to the strips 408 of the newly added data storage device 124 as soon as the new data storage device 124 is added to the virtual storage device 128, the strips 408 provided by that new device 124 are immediately available for the storage of data.

FIG. 5 also illustrates a data moved array 326 and the contents of the data moved array 326 following expansion of the virtual storage device 128 by the addition of the new storage device unit D2 124, and the assignment of addresses to the strips 408 of the newly added data storage device 124 according to the new disk mapping function 508. As shown, each of the available strips 408, identified in the data moved array 326 by logical address 416, is associated with either a first status value ("0" or false in the example of this figure), indicating that the strips 408 of data must be relocated, or a second status value ("1" or true in the example of this figure), indicating that the strip of data 408 is in a location in the virtual storage device 128 that complies with the final mapping function and does not need to be relocated. In the example, the logical addresses 416 for the first number of strips corresponding to the number of data storage device units 124 included in the virtual storage device 128 prior to expansion are set to the second status value, indicating that the strips of data are in a location conforming to the final mapping function, and therefore indicating that the data contained in those strips does not need to be relocated. Similarly, in the example data moved array 326 the last strip is assigned the second status value, indicating that the data contained in that strip is in a location conforming to the final mapping function. Of course, for certain alternate arrangements, different strips 408 may be in their final locations prior to the restriping or rearrangement of data in the virtual storage device 128 after the addition of a storage device unit 124. The remaining strips are associated with the first status value, indicating that the data contained in that strip will need to be relocated in order to conform to the final mapping function.

Having made all of the strips 408 of data storage across the included data storage device units 124 in the virtual storage device 128 available, the data strips 408 are then redistributed to conform to the desired arrangement or RAID level. In accordance with embodiments of the present invention, the full storage capacity of the expanded virtual storage device 128 remains available to a host computer or processor 108 during the redistribution or restriping process. As described herein, restriping generally involves the use of the data moved array 326 to track whether a strip 408 of data included in the virtual storage device 128 is in a location corresponding to a final mapping function, and the use of the temporary storage buffers 324 to enable data to be moved while maintaining the availability to a host computer 108 of all of the strips contained in the expanded virtual storage device 128. In addition, the redundancy information array (which can comprise a parity coverage array) 330 is provided for virtual storage devices 128 that incorporate parity data or other redundancy information, to identify whether parity data for a stripe 412 covers the strips 408 of the newly added storage device unit or units 124 included in that stripe 412, or only the strips 408 of the original or preexisting data storage device units 124.

Figure 6:
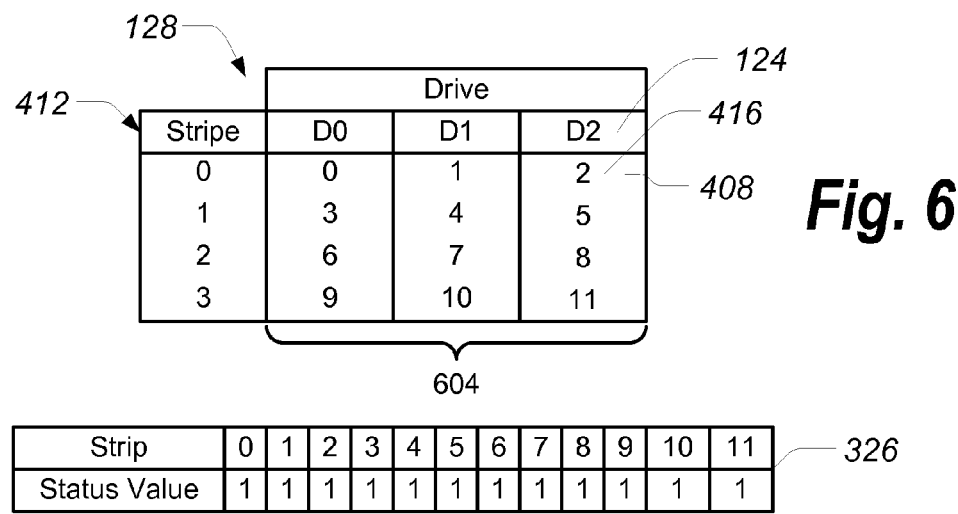
FIG. 6 is a graphical depiction of the mapping of a virtual storage device according to a final mapping function following expansion of that device by the addition of an additional storage device unit and after restriping.

FIG. 6 is a graphical depiction of the mapping of a virtual storage device 128 after expansion by the addition of one or more storage device units 124 and after restriping according to a final mapping function 604. As shown by the figure, the final mapping function 604 distributes the strips across all of the drives 124 of the virtual storage device 128 depicted in the map in a striped fashion. Accordingly, the pattern of the final mapping function 604 is like the pattern established by the initial mapping function 404, except that in the final mapping function 604 that pattern extends to include the additional data storage device unit 124, unit D2 in FIG. 6. Completion of the reordering of the location of data strips is confirmed by the data moved array 326, which shows that each strip in the expanded virtual storage device 128 (identified by logical addresses 0-11) is associated with the second status value (a value of "1" in the example data moved array 326).

Figure 7:
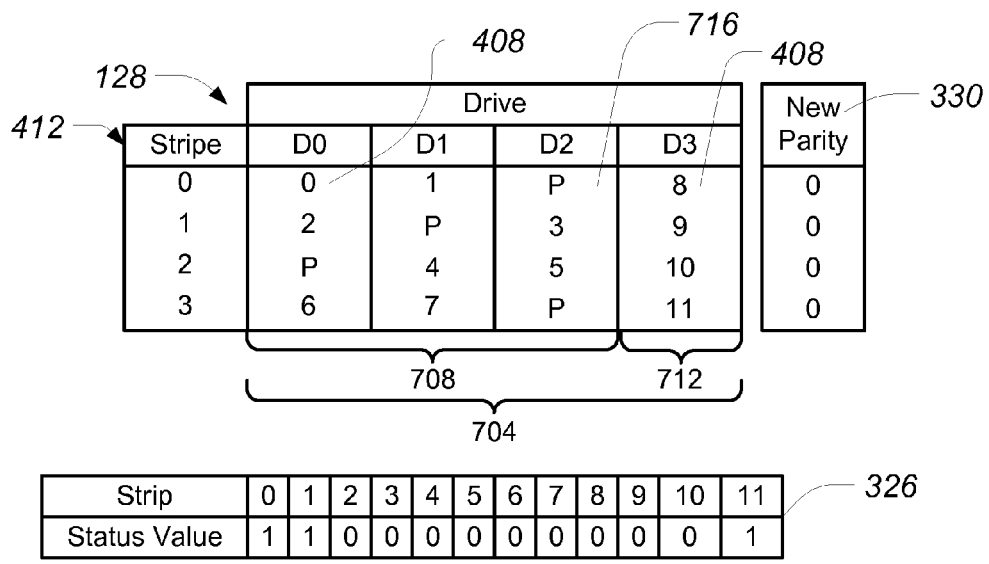
FIG. 7 is a graphical depiction of the mapping of a virtual storage device incorporating strips of parity data according to a first mapping function, immediately following expansion of that virtual storage device by the addition of an additional storage device unit.

FIG. 7 is a graphical depiction of the mapping according to a first mapping function 704 of strips 408 included in a virtual storage device 128 incorporating parity data in accordance with embodiments of the present invention, after expansion of the virtual storage device 128 by the addition of a storage device unit 124 (drive D3 in FIG. 7). More particularly, the data strips 408 of the original or preexisting data storage device units 124 (drives D0-D2 in FIG. 7) are assigned according to an initial mapping function 708, while the data strips 408 available on the new data storage device unit 124 (drive D3 in the figure) are assigned according to a new disk mapping function 712. In general, according to the initial mapping function 708, each stripe 412 of data includes one strip of redundancy information 716. As can be appreciated by one of skill in the art, the strip of redundancy information 716 is derived from the other strips 408 of data in that stripe 412, and enables the reconstruction of a strip 408 of user data in the stripe 412 if the data storage device unit 124 containing the user data 408 is lost. In addition to a data moved array 326, a virtual storage device 128 incorporating redundancy information includes a redundancy information array 330 that for each stripe 412 of the virtual storage device 128 associates either a first value (e.g., a 0 or false) or a second value (e.g., a 1 or true) with the stripe 412 indicating whether redundancy information for the stripe 412 applies only to the user data in the strips 408 originally located in that stripe 412 (i.e., located in that stripe 412 prior to expansion of the virtual storage device 128), or to all of the user data in the stripe 412. In the example redundancy information array 330 in FIG. 7, the value for each stripe 412 is the first value (shown as "0" in the figure), indicating that the redundancy information does not cover new user data strips 408 on the added storage device unit 124.

Figure 8:
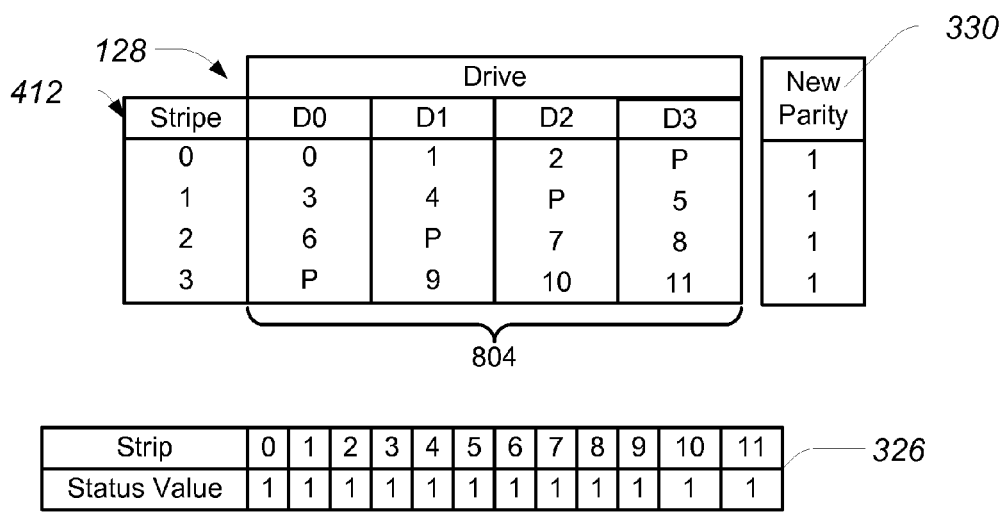
FIG. 8 is a graphical depiction of the mapping of a virtual storage device incorporating strips of parity data according to a final mapping function after expansion of that virtual storage device by the addition of an additional storage device unit and after restriping.

FIG. 8 illustrates a mapping of the virtual data storage device 128 shown in FIG. 7 according to a final mapping function 804 following restriping, such that the arrangement of redundancy information and user data across the virtual storage device 128 is in the desired pattern (here RAID 5) across all of the data storage units 124 of the expanded virtual storage device 128 (i.e., across drives D0-D3). In addition, each strip 408 is associated with the second value in the data moved array 326, indicating that the data is in the final location. In addition, the status value for each stripe 412 in the redundancy information array 330 is true, indicating that the redundancy data for a stripe 412 covers each strip 408 of user data in that stripe 412.

Figure 9:
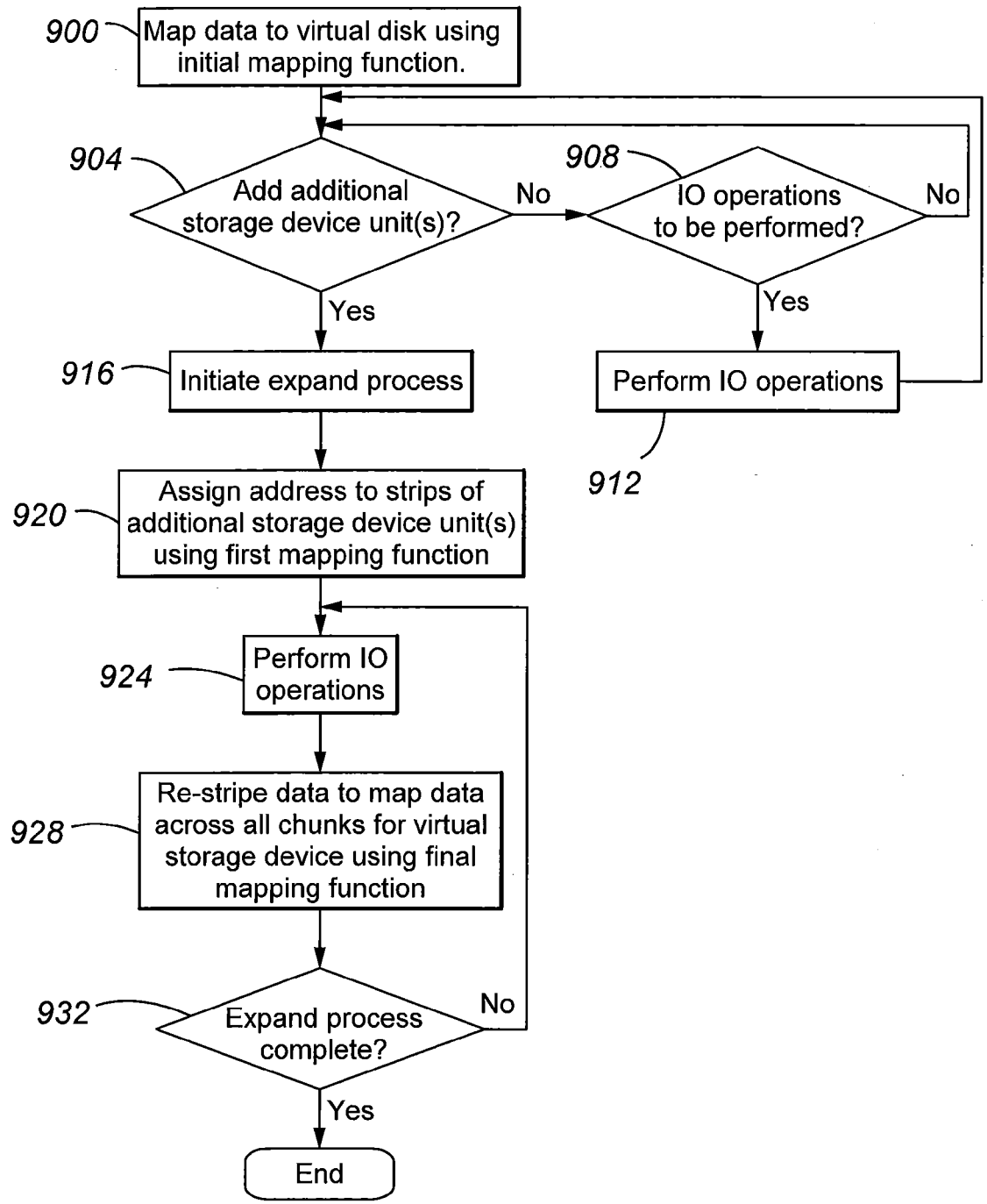
FIG. 9 is a flowchart illustrating aspects of a process for expanding a virtual storage device in accordance with embodiments of the present invention.

FIG. 9 is a flowchart illustrating aspects of a process for expanding a virtual storage device 128 in accordance with embodiments of the present invention. Initially, at step 900, data is mapped to the virtual disk 128 (in a pre-expanded state) using an initial mapping function 404. In general, the initial mapping function 404 implements the desired arrangement of data (and parity, if provided) according to a selected RAID level or other scheme or pattern. For instance, for a RAID 0 array, the initial mapping function for a virtual storage device 128 with N original storage device units 124 is:

$$F_{initial}(\text{host-lba}) \rightarrow (\text{host lba mod } N, \text{host lba div } N)$$

where "mod" and "div" are natural number modulo and division respectively.

At step 904, a determination is made as to whether the virtual disk is to be expanded by adding additional storage device units. If this determination is negative, a determination is made whether there are IO operations to be performed (step 908). If there are IO operations to perform, the IO operations are performed (step 912).

Figure 10:
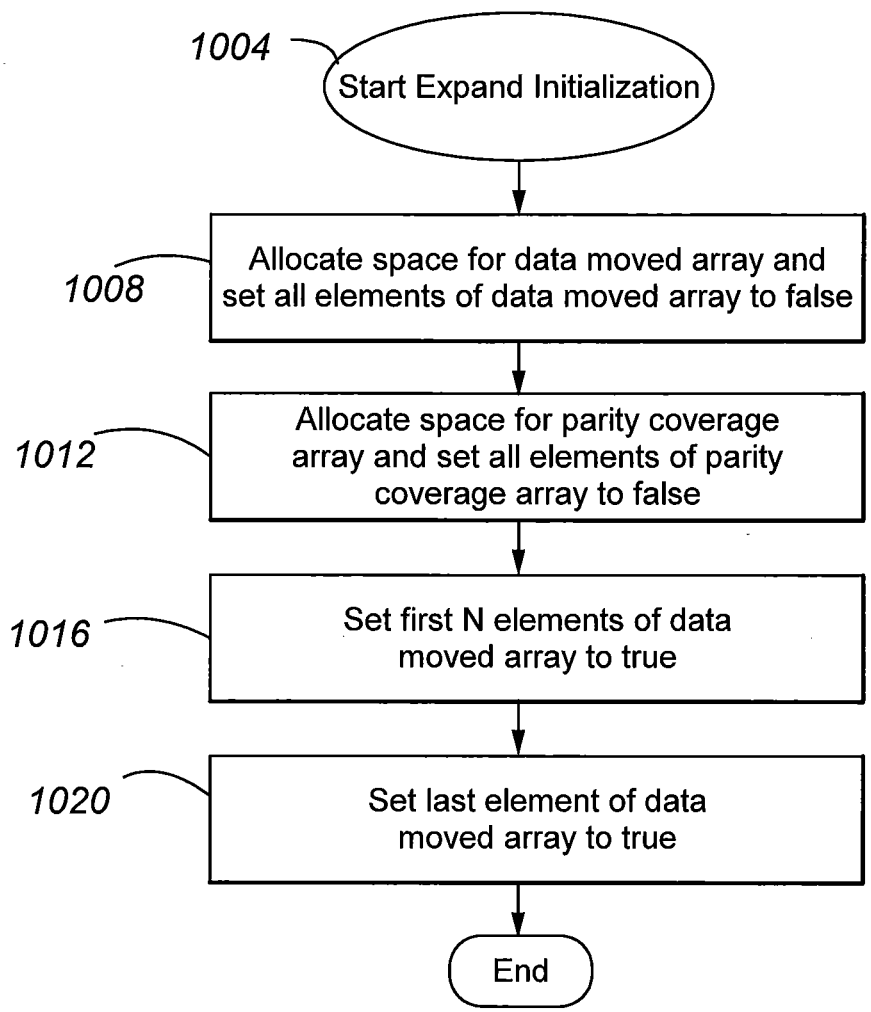
FIG. 10 is a flowchart illustrating additional aspects of a process for expanding a virtual storage device in accordance with embodiments of the present invention.

If it is determined that one or more additional storage devices 124 are to be added to the virtual storage device 128 (i.e., that the virtual storage device 128 is to be expanded), the expand process is initiated (step 916). With reference now to FIG. 10, the initiation of the expand process in accordance with embodiments of the present invention is illustrated. In particular, after starting the expand initialization space in memory or in a virtual storage device is allocated for the data moved array (step 1004), and all of the elements of the data moved array 326 are set to false (i.e., to a first status value) (step 1008). At step 1012, space in memory or in a virtual storage device is allocated for the redundancy information array, and all of the elements of the redundancy information array 330 are set to false (i.e., to a first value). At step 1016, the first number of elements of the data moved array 326, not including any data storage units 124 used solely to store redundancy information, are set to true (i.e., to a second value), corresponding to the number of data storage units 124 in the virtual storage device 128 prior to expansion of the virtual storage device 128 by the addition of one or more new or added storage device units 124 are set to true (i.e., to a second value) for a RAID-0. At step 1020, the last element of the data moved array 326 is set to true. Although the steps of initialization discussed in connection with FIG. 10 are presented in series, it should be appreciated that the exact sequence illustrated is not necessary, provided that each array 326, 330 is cleared by setting the elements to false prior to setting some of the elements to true as set forth in steps 1016 and 1020.

With reference again to FIG. 9, addresses are assigned to the strips 408 of the additional storage device unit or units 124 using the first mapping function 504 (or using the new disk mapping function 508, which is included in the first mapping function) (step 920). In general, a mapping function takes a host logical block address and determines a corresponding storage device unit 124 and the strip 408 on that storage device unit. For instance, in accordance with embodiments of the present invention, the new disk mapping function is as follows:

$$F_{new\text{-}disk}(\text{host-lba}) \rightarrow (\text{new-disk-lba mod } M, \text{new-disk-lba div } M)$$

where new-disk-lba=host-lba−N×B and the host logical block address is greater than the highest logical block address 416 included in the original storage device units 124 of the pre-expanded virtual storage device 128, and where M is the number of new storage device units 124 added to the virtual storage device 128. An example of applying the new-disk mapping function 508, 712 is given in FIG. 5. After assigning addresses to the strips 408 of the additional storage device unit 124 at step 920, the expand process is performed in parallel with I/O operations (steps 924 and 928). This operation continues until the expand process is determined to be complete (step 932).

During the performance of JO operations, but prior to restriping of the virtual storage device unit 128, the control and mapping functions 336 correlate a host logical block address received in connection with an JO request from a host computer or processor 108 by applying the first mapping function 504, 704. The first mapping function is defined as follows:

$$F_{first\text{-}mapping} \rightarrow \text{if LBA is} < (N \times B) \text{ then} \\ F_{initial}(\text{host-lba}) \\ \text{else} \\ F_{new\text{-}disk}(\text{new-disk-lba})$$

Where N is the number of storage device units 124 originally included in the virtual storage device 128, and where B is the capacity in strips 408 of the storage device units 124 included in the virtual storage device 128.

In addition to the first mapping function, a reverse mapping function is required. The reverse mapping function takes a disk or storage device unit 124 number and disk logical block address and determines the corresponding host logical block address, where disk logical block address corresponds to the strip 408 of the subject storage device unit 124. The reverse first mapping function for a RAID 0 array is defined as follows:

$$F_{reverse\text{-}first\text{-}mapping}(\text{disk-number, disk-lba}) \rightarrow \\ \text{If disk-number is} >= N \text{ then} \\ \text{host-lba} = N \times B + (\text{disk-lba} \times M) + (\text{disk-number} - N) \\ \text{else} \\ \text{host-lba} = \text{disk} - \text{lba} \times N + \text{disk-number}$$

Where N and B are the same as previously defined and M is the number of new storage device units added to the virtual storage device.

After the expand process has been initiated, data is re-striped while IO operations continue to occur. The re-striping operation is interleaved with IO operations. It will be realized by one skilled in the art that there are several ways of prioritizing IO operations relative to re-striping operations depending on the relative performance desired for each operation. This interleaved operation is shown in FIG. 9 as steps 928 and 932.

Following completion of the expand process, the data is restriped to map the data across all of the chunks or strips 408 of the virtual storage device 128 using the final mapping function 604, 804. The final mapping function 604, 804 distributes the strips of data across all of the drives or storage device units 124 of the expanded virtual storage device 128 according to the desired arrangement. For example, the final mapping function 604, 804 may distribute data across the storage device units 124 according to a desired RAID level. Therefore, different final mapping functions 604, 804 can be applied to achieve different desired arrangements of data. For instance, the example distribution according to a final mapping function 604 illustrated in FIG. 6 implements a RAID 0 array, in which data is striped across all of the included storage device units 124.

The final mapping function for a RAID 0 array is:

$$F_{final} \rightarrow (\text{host-lba mod}(N+M), \text{host-lba div}(N+M))$$

As another example, the example distribution according to a final mapping function 804 illustrated in FIG. 8 implements a RAID 5 array. However, it should be appreciated that embodiments of the present invention are not limited to the implementation of a RAID 0 or a RAID 5 array. For example, embodiments of the present invention may also be applied to implementing the expansion of a virtual storage device 128 according to RAID 6, RAID 10, RAID 50, RAID 60 and variations of these RAID levels.

The process of restriping data to implement the desired final mapping function, also referred to herein as the expand process, provided by embodiments of the present invention permits a host computer or processor 108 to have access to all of the strips 408 of the expanded virtual storage device 128 while the device 128 is being restriped.

Figure 11:
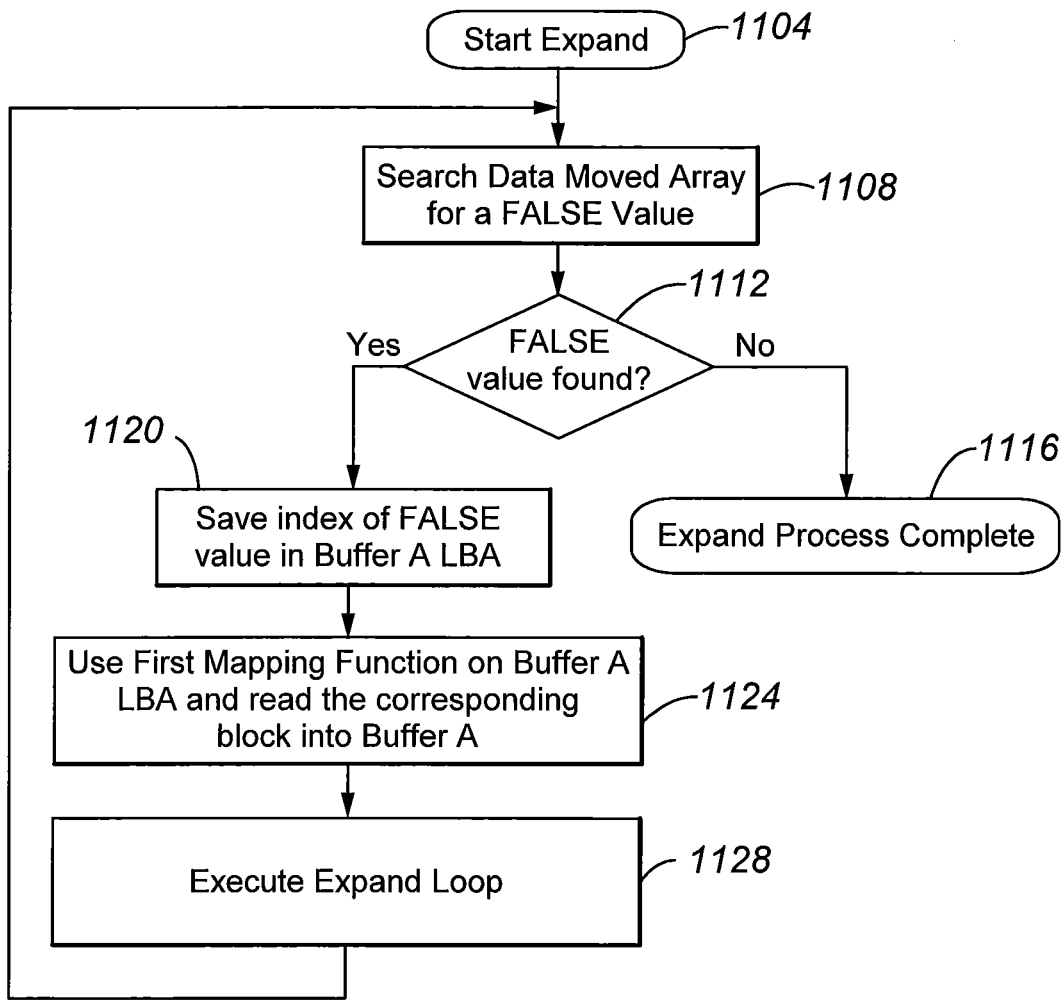
FIG. 11 is a flowchart illustrating aspects of an expand process in accordance with embodiments of the present invention.

As shown in FIG. 11, after starting the expand process (step 1104), the data moved array 326 is searched to identify a false value (step 1108). A determination is then made as to whether a false value has been found (step 1112). If a false value is not found, the expand process is complete (step 1116).

If a false value is found in the data moved array 326, the index of the logical address with which the false value is associated is saved in the first temporary storage buffer 324a provided as part of the temporary data storage 316 (step 1120). That is, the logical block address 416 of the first strip 408 identified in the data moved array 326 as being associated with a first (i.e., false) value is set as the logical block address of the first temporary storage buffer 324a. The logical block address 416 associated with the temporary storage buffer 324 is then applied to the first mapping function to identify the source location in the virtual storage device 128 for the associated first strip 408 of data, and this strip 408 of data is copied or read into the first temporary storage buffer 324a (step 1124). The expand loop is then executed, as described in greater detail in connection with FIG. 12 (step 1128). After executing the expand loop, the process returns to step 1108 to again search for a false or first value in the data moved array 326.

Figure 12:
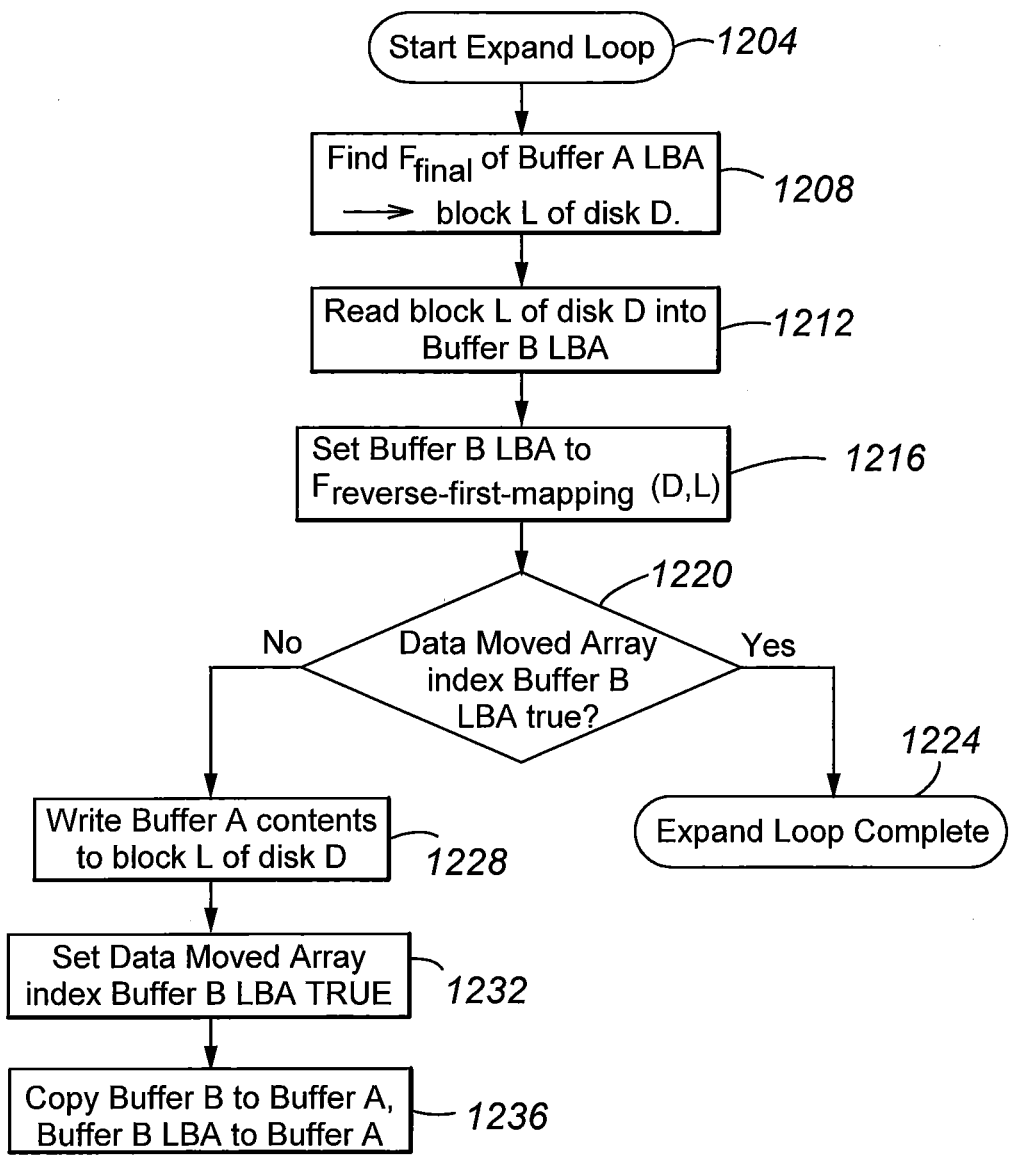
FIG. 12 is a flowchart illustrating aspects of an expand loop in accordance with embodiments of the present invention.

FIG. 12 illustrates the execution of the expand loop in accordance with embodiments of the present invention. At step 1204, the expand loop is started. The destination location of the data held in the first temporary storage buffer (buffer A) 324a is located by applying the address associated with that data to the final mapping function (step 1208). The data held in the identified destination location or strip is read into the second temporary storage buffer (buffer B) 324b (step 1212). At step 1216, the logical block address of the second temporary storage buffer 324b is set to the address for that destination location determined by applying the destination location to the reverse mapping function.

A determination may then be made as to whether the data moved array index for the address associated with the second temporary storage buffer 324b is true (step 1220). If the value in the data moved array 326 for that address is true, the expand loop is complete (step 1224) and will exit, at which point the expand process returns to step 1108 (see FIG. 11). If the data moved array 326 index for the second temporary storage buffer 324b is false, the contents of the first temporary storage buffer 324a are written to the strip 408 comprising the destination location for that data in the virtual storage device 128 (step 1228). At step 1232, the status value associated with the logical block address for the strip of data held in the second temporary storage buffer 324a is set to the second value (i.e., true) and the contents of and address associated with the second temporary storage buffer 324b is copied to the first temporary storage buffer 324a (step 1236). Alternatively, the identification of the first temporary storage buffer 324a can be swapped with the second temporary storage buffer 324b. As yet another alternative, each iteration of the expand loop can alternate between processing the first and second buffers 324 at each step of the loop. The process may then return to step 1208.

Figure 13A:
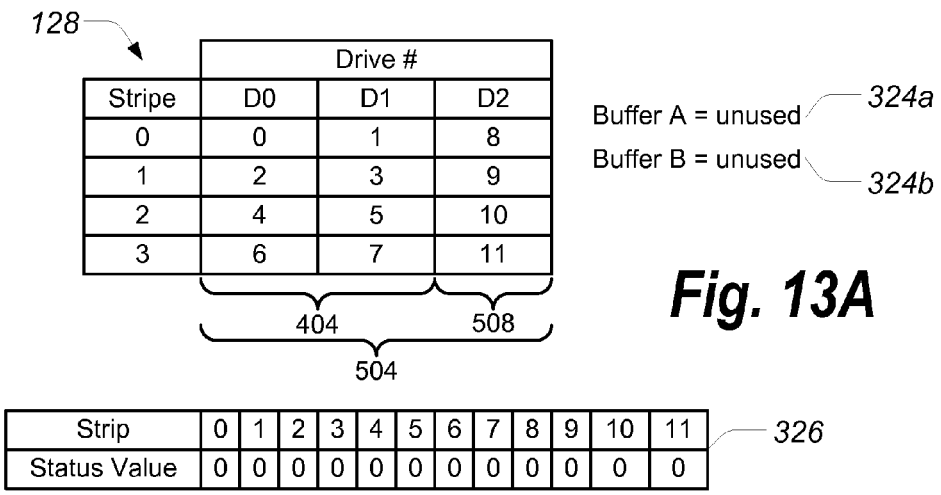

FIGS. 13A-13L illustrate the mapping of a virtual storage device 128 at different points during the process of restriping an expanded virtual storage device 128 according to a final mapping function. In particular, FIG. 13A illustrates the mapping of the example virtual storage device 128 according to a first mapping function 504, in which the original storage device units D0 and D1 124 are mapped according to an initial mapping function 404, and the new or added storage device unit D2 124 is mapped according to a new disk mapping function 508. As can be appreciated by one of skill in the art, the initial mapping function 404 establishes a pattern of data striping (RAID 0 in this example) across the original storage device units D0 and D1 124. The sequential addressing of the new storage device unit D2 124 according to the new disk mapping function 508 is not in accordance with the pattern established on the original storage device units D0 and D1 124. Therefore, the process of restriping in accordance with embodiments of the present invention will be carried out in order to reestablish the desired distribution or pattern across all of the data storage units D0, D1 and D2 124 of the expanded virtual storage device 128. Moreover, it is apparent that, by assigning addresses to the strips 408 provided by the added storage device unit 124 according to the new disk mapping function 508, that added storage capacity is immediately available, even though the arrangement of data ultimately desired (here RAID 0) will need to be reestablished. Also in FIG. 13A, the data moved array 326 has been reset, such that each of the logical block addresses are associated with a first or false status value.

Figure 13B:
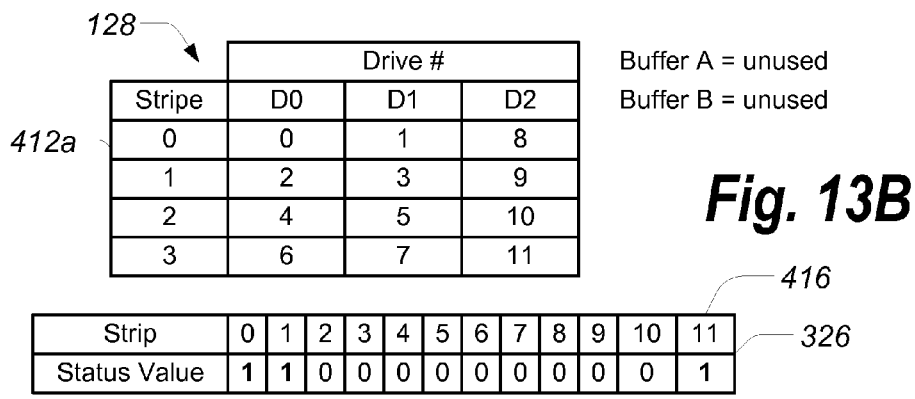

In FIG. 13B, the data moved array 326 is updated to indicate a second or true status value for each strip 408 in the virtual storage device 128 that does not need to be relocated. For the present example of a RAID 0 array, the strips 408 that do not need to be relocated are those strips 408 of the original storage device units D0, D1 124 (i.e., the storage device units 124 of the pre-expanded virtual storage device 128), that is, the first stripe 412a of the virtual storage device 128. In addition, the data in the last strip 408 of the last storage device unit 124 included in the virtual storage device 128 does not need to be relocated. Accordingly, in the present example, the strips 408 having logical block addresses of 0, 1 and 11 are all associated with the second status value.

Figure 13C:
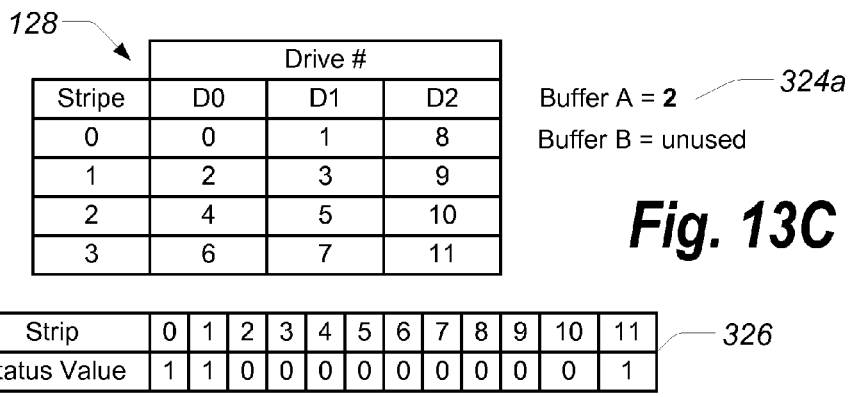

In FIG. 13C, the first strip 408 that needs to be relocated (here the strip at logical block address 2) is identified in the data moved array 326 by identifying the first strip 408 associated with a first or false status value. The data occupying this source location for the first strip 408 is then read into the first one of the temporary storage buffers 324. In the present example, strip 2 is read into temporary storage buffer A 324a. The expand loop is now ready to begin.

FIG. 13D shows the results of the first step of the expand loop. The destination of the strip in Buffer A is determined using the Final Mapping Function. The Reverse First Mapping Function is used to determine the logical address of the strip at this location (logical block address 8). This strip is read into a second one of the temporary storage buffers 324b, referred to as Buffer B, after which the strip in the first temporary storage buffer 324a, Buffer A (logical block address 2), is written according to application of the final mapping function.

In addition, it can be seen that the data in the original location for the first strip 408 is marked with brackets, indicating that the data contained at that location comprises the pre-expand value of the strip and therefore indicating that the data should not be used, since it might be out of date. For example, if the data associated with logical block address 2 were updated, the update would be performed in connection with the destination location, and therefore the data at the original location would be out of date.

Also, the status value associated with logical block address 2 in the data moved array 326 is updated to the second or true status value, to indicate that the data has been moved to its destination location according to the final mapping function.

The data displaced by the relocation of strip 2 is then placed into its destination location. This is illustrated in FIG. 13E. In particular, the destination location for the data held in the temporary storage buffer 324, strip 8, is determined to be strip 2 of the new or added storage device unit D2 124. Accordingly, the strip of data occupying that destination location, strip 10, is read into a first one of the temporary storage buffers 324a, to preserve that data while allowing strip 8 (a Kth strip) to be placed in its destination location. The status value for strip 8 in the data moved array 326 is then updated to the second value or true. This is the state illustrated in FIG. 13E.

As shown in FIG. 13F, the destination location for strip 10 is identified according to the final mapping function. In the present example, this destination location is strip 3 of the second storage device unit D1 124, which is occupied by strip 7. Strip 7 is copied to the temporary storage buffer 324 not occupied by strip 10 (i.e., it is copied into the second temporary storage buffer 324b). Strip 10 is then copied from the first temporary storage buffer 324a into its destination location, and the status value for strip 10 408 in the data moved array 326 is updated to the second or true status value.

As illustrated in FIG. 13G, the destination location for strip 7 is then identified as the location on the second storage device unit D1 124 associated with the second stripe 412 of the virtual storage device 128, which is occupied by strip 5. Strip 5 is read into to the first temporary storage buffer 324a, and strip 7 is copied from the second temporary storage buffer 324b into its destination location. The data moved array 326 is then updated to associate strip 7 with the second or true status value.

As shown in FIG. 13H, the destination location for strip 5 according to the final mapping function is then identified as the second strip 408 in the third storage device unit D2 124, in the second stripe 412, which is occupied by strip 9. Strip 9 is moved to the second temporary storage buffer 324b, and strip 5 is copied from the first temporary storage buffer 324a to its destination location. The status value for strip 5 held by the data moved array 326 is then updated to the second status value or true to indicate that strip 5 has been moved to its destination location.

As shown in FIG. 13I, the destination location according to the final mapping function for strip 9 is then identified as being located on the first storage device unit D0 124, in the third stripe 412 of the virtual storage device 128, which is occupied by strip 6. Strip 6 is moved to the first temporary storage buffer 324a. Strip 9 can then be copied from the second temporary storage buffer 324b to its destination location, and the status value held for strip 9 by the data moved array 326 is updated to the second or true value.

Figure 13J:
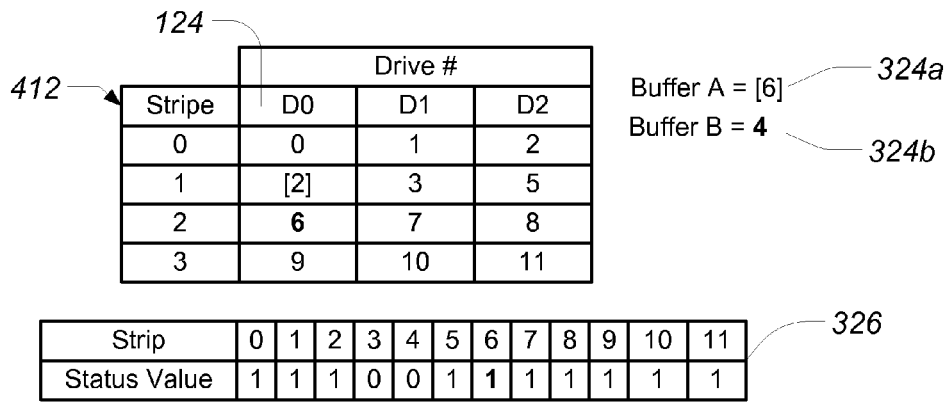

As shown in FIG. 13J, the destination location according to the final mapping function for strip 6 is then identified as being on the first storage device unit D0 124, in the third stripe, which is occupied by strip 4. Strip 4 is read into the second temporary storage buffer 324b, allowing strip 6 to be written from the first temporary storage buffer 324a to its destination location. The data moved array 326 is updated to indicate that strip 6 is in its destination location by associating the second or true value with that strip.

Figure 13K:
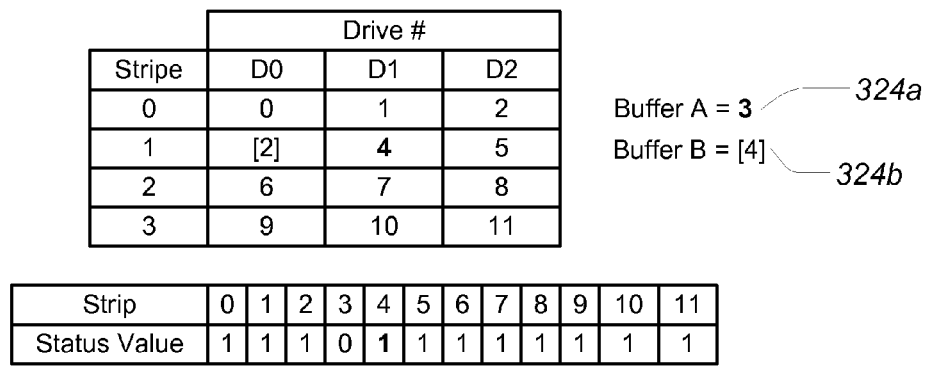

As shown in FIG. 13K, applying the final mapping function, the destination location for strip 4 is identified as the second storage device unit D1 124, in the second stripe, which is occupied by strip 3. Strip 3 is read into the first temporary storage buffer 324a, and strip 4 is written from the second temporary storage buffer 324b to its destination location. In addition, the data moved array 326 is updated to indicate that strip 4 has been moved to its destination location by associating the second or true value with strip 4.

Figure 13L:
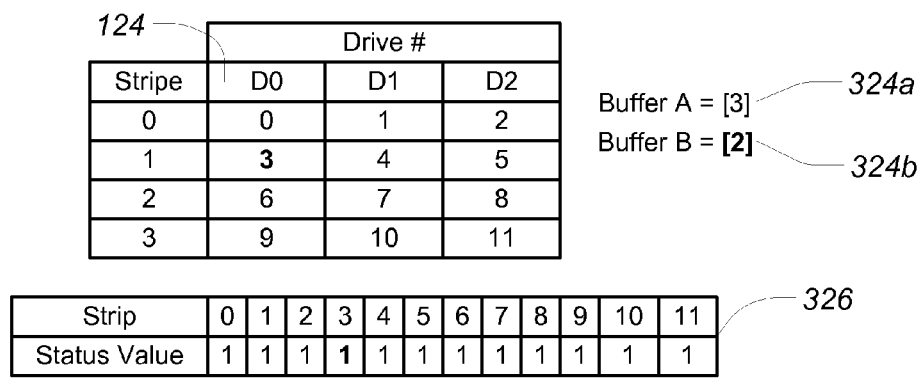

As shown in FIG. 13L, the destination location for strip 3 is then identified as being in the second strip of the first storage device unit D0 124, which is occupied by the outdated copy of strip 2. The outdated copy of strip 2 can (but need not) be read into the second temporary storage buffer 324b. Strip 3 is written to its destination location, and the status value associated with strip 3 held by the data moved array 326 is updated to indicate that the strip is in its destination location. At this point, it can be seen that each strip 408 of the virtual storage device 128 is associated with the second or true status value in the data moved array 326. Moreover, if the final mapping function were used to identify a destination location for data in the temporary storage buffers 324, that data would be written to a strip that, as indicated by the data moved array 326, has already been relocated to its final destination location. Accordingly, it is apparent that the process is complete.

If any of the strips 408 is associated with a first or false status value in the data moved array 326, the expand process is restarted at that strip. Moreover, since different arrangements of data in a virtual storage device 128 may result in data being held in the temporary storage buffers 324 that would be relocated to strips that are in their final destination location, the data moved array 326 is scanned to determine whether any strips remain to be relocated. In general, the greatest common divisor of the number of original storage device units (N) and the number of added storage device units (M) indicates the number of times the process must be performed. Alternatively or in addition to performing the expand process multiple times, multiple strips may be moved at a time, for example by providing additional temporary storage buffers 324.

Figure 14A:
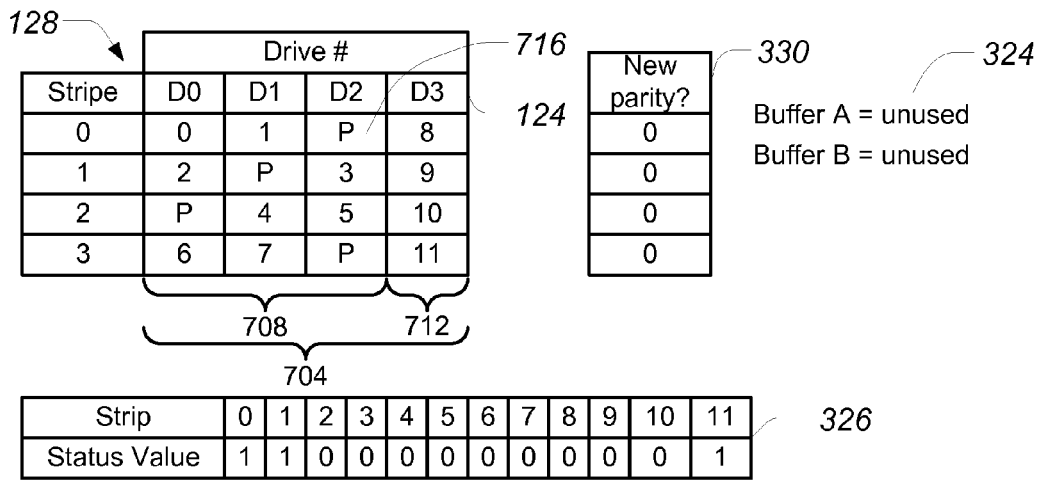

FIGS. 14A-14G illustrate the mapping of a virtual storage device 128 at different points during the process of restriping an expanded virtual storage device 128 that includes parity data according to a final mapping function. In particular, FIG. 14A illustrates the mapping of the example virtual storage device 128 according to a first mapping function 704 in which the original storage device units D0, D1 and D2 124 are mapped according to an initial mapping function 708, and a new or added storage device unit D3 124 is mapped according to a new disk mapping function 712. As can be appreciated by one of skill in the art, the initial mapping function 708 establishes a pattern of user and parity data conforming to a RAID 5 arrangement in the illustrated example across the original storage device units D0, D1 and D2 124, in which one strip of redundancy information 716 is included in each stripe across the virtual storage device 128. Moreover, the sequential addressing applied by the new disk mapping functions 712 to storage device unit D3 124 is not in accordance with the pattern established on the original storage device units D0, D1 and D2 124. Accordingly, the process of restriping in accordance with embodiments of the present invention will be carried out in order to reestablish the desired distribution or pattern across all of the data storage units D0, D1, D2 and D3 124 of the expanded virtual storage device 128. Moreover, it is apparent that, by assigning addresses to the strips 408 available on the new storage device unit D3 124, the added storage capacity is immediately available, even prior to restriping of the virtual storage device 128. Also in FIG. 14A, the data moved array 326 has been initialized, to indicate those strips 408 that need to be relocated (by association with a false value) and those strips that do not need to be relocated (by association with a true value). In addition, the redundancy information array 330 has been initialized and indicates that each stripe 412 needs to have new redundancy information generated and relocated in order to cover the newly-added storage capacity.

Figure 14B:
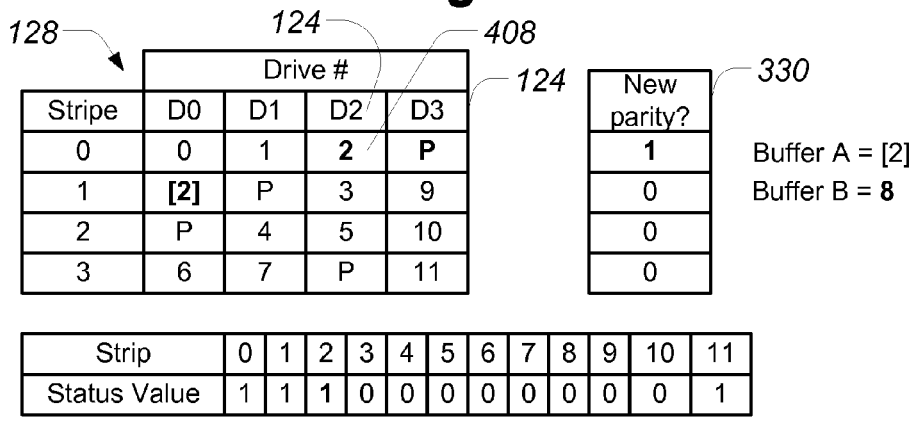

In accordance with embodiments of the present invention, a virtual storage device 128 incorporating redundancy information is restriped by moving user data to the proper post-expand location and, once all of the data in a stripe 412 is located in the proper post-expand location, generating parity for that stripe and storing that parity data in the proper post-expand location. With reference now to FIG. 14B, the strip 408 associated with logical block address 2 has been moved to its proper post-expand location in stripe 0 on storage device unit D2 124. Because data has been written to the first stripe, redundancy information is generated for those strips (i.e., strips 0, 1 and 2), and the resulting redundancy information is written to its proper post-expand location, in stripe 0 on storage device unit D3 124. The redundancy information array 330 is updated to associate a second or true value with the first stripe 412, indicating that the redundancy information covers each strip of user data in the stripe 412.

Figure 14C:
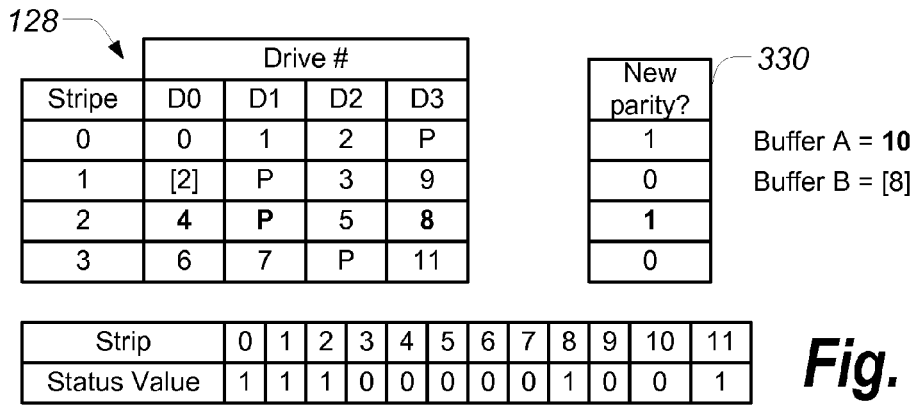

In FIG. 14C, the arrangement of data on the virtual storage device 128 is shown after strips 408 and parity for stripe 2 have been relocated. As part of relocating the redundancy information, that data is regenerated to cover each strip included in the stripe 412. Accordingly, the value for stripe 2 in the parity coverage array 330 is set to true.

As shown in FIG. 14D, parity data is rewritten and relocated after relocating strip 10. As part of relocating and regenerating the redundancy information, each of the strips in stripe 3 is now covered by the redundancy information, and therefore the value for stripe 3 in the redundancy information array 330 is set to true.

FIG. 14E illustrates the placement of strip 7 into its proper post-expand location in stripe 2. As part of writing strip 7 to stripe 2, the redundancy information for that stripe is updated.

FIG. 14F illustrates the placement of strip 5 into its proper post-expand location in stripe 1 and the regeneration and relocation of the redundancy information for that stripe, which includes swapping the location of strip 3 and the redundancy information. As part of the regeneration of the redundancy information, each strip 408 included in stripe 1 412 is now covered by the redundancy information, and therefore the value for stripe 1 in the redundancy information array 330 is set to true. At this point, each strip of redundancy information 716 has been placed in its proper post-expand location. Accordingly, the process will now continue in the same fashion as for a virtual storage device 128 that does not include redundancy information, except that the redundancy information will remain in the location illustrated in FIG. 14F. As strips of data 408 are relocated as part of the restriping process, redundancy information for each stripe will be updated as necessary so that the redundancy information is proper for the data strips in the stripe.

Although certain examples provided in the present description have illustrated restriping of an expanded virtual storage device 128 in accordance with embodiments of the present invention in connection with particular RAID levels, it should be appreciated that embodiments of the present invention are not so limited. In particular, embodiments of the present invention can be applied to any arrangement of data, including any RAID level, on a virtual storage device. Moreover, variations may include the provision of additional temporary storage buffers, for example to allow the relocation of multiple strips of data simultaneously. In addition, the implementation of various components and features may be different. For example, in addition or as an alternative to existing in the memory 308 of a controller, information such as the data moved away 326 and/or the parity coverage array may be stored in one or more storage device units 128 of a virtual storage device.

In addition, it should be appreciated that embodiments of the present invention may be performed in connection with redundant or paired controllers 212, in order to provide redundancy.

The foregoing description of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for expanding a virtual storage device, comprising:
  expanding the virtual storage device that includes N storage device units by adding M storage device units, wherein each of the N storage device units and the M storage device units have B strips available for data storage, wherein each of the B strips in the N storage device units are assigned a logical address according to an initial mapping function, wherein data in the M storage device units is not required to be initialized, wherein data stored in the B strips in the N storage device units have an original physical location corresponding to the initial mapping function, and wherein each of the B strips in the initial mapping function are arranged in the same order as the B strips in the M storage device units;

assigning a logical address to each of the B strips in the M storage device units according to a new storage device mapping function, wherein the logical addresses assigned to the B strips in the M storage device units are sequentially concatenated to the highest logical address in the initial mapping function;

identifying by logical address in the initial mapping function each strip in each of the (N+M)×B strips available for data storage;

assigning a new logical address to each of the B strips in the combined N+M storage device units according to a final mapping function;

assigning a first status value to each strip that has a location in the virtual storage device that does not conform to the final mapping function, wherein all strips except the first N strips of the initial mapping function and the last strip of the new storage device mapping function have the first status value;

assigning a second status value to each strip that has a location in the virtual storage device that conforms to the final mapping function, wherein the first N strips of the initial mapping function and the last strip of the new storage device mapping function have the second status value, wherein data in strips having the second status value are not copied elsewhere while expanding the virtual storage device, wherein strips having the second status value always maintain the second status value while expanding the virtual storage device;

after assigning first and second status values, selecting a first strip associated with the first status value, wherein the first strip associated with the first status value is the first strip in the new storage device mapping function;

identifying the logical address of the selected first strip, wherein the logical address of the selected first strip is the address of the first strip in the new storage device mapping function;

determining a destination location for the selected first strip, wherein the destination location for the selected first strip is determined by applying the logical address of the selected first strip to the final mapping function;

writing data in a second strip occupying the destination location for the selected first strip to a first temporary storage buffer, wherein the data in the second strip is associated with a second logical address, wherein the first temporary storage buffer is separate from the virtual storage device; and writing data stored in the original location of the selected first strip to the destination location for the selected first strip, wherein the destination location for the selected first strip conforms to the final mapping function.

2. The method of claim 1, further comprising:
determining a destination location for the second strip, wherein the destination location for the second strip is determined by applying the second logical address to the final mapping function;
writing data stored in the original location of a third strip occupying the destination location for the second strip to a second temporary storage buffer, wherein the second temporary storage buffer is separate from the virtual storage device; and
writing the data from the second strip stored in the first temporary storage buffer to the destination location for the second strip, wherein the destination location for the second strip conforms to the final mapping function.

3. The method of claim 2, further comprising:
determining a destination location for the third strip, wherein the destination for the third strip is determined by applying the logical address of the third strip to the final mapping function;
writing data stored in an original location of a fourth strip occupying the destination location for the third strip to the first temporary storage buffer; and
writing the data from the third strip stored in the second temporary storage buffer to the destination location for the third strip, wherein the destination location for the third strip conforms to the final mapping function.

4. The method of claim 3, further comprising:
given data for a Kth strip stored in a first one of two temporary storage buffers, determining a destination location for the Kth strip, wherein the destination location for the Kth strip is determined by applying the logical address of the Kth strip to the final mapping function;
writing data stored in an original location of a K+Ith strip occupying the destination location for the Kth strip to a second one of two temporary storage buffers; and
writing the data from the Kth strip stored in the first one of two temporary storage buffers to the destination location for the Kth strip, wherein the destination location for the Kth strip conforms to the final mapping function.

5. The method of claim 2, further comprising:
after writing data from the first temporary storage buffer, determining a destination location for a strip stored the temporary storage buffer; and
in response to determining that the destination location for the strip stored in the second temporary storage buffer is occupied by a strip associated with the second value in a data moved array, scanning the data moved array to determine whether a Jth strip is associated with the first status value.

6. The method of claim 5, further comprising:
in response to determining that a Jth strip is associated with the first status value, selecting the Jth strip;
identifying the logical address for the selected Jth strip;
determining a destination location for the selected Jth strip, wherein the destination location is determined by applying the logical address for the selected Jth strip to the final mapping function;
writing data in a Kth strip occupying the destination location for the selected Jth strip to the first one of the first and second temporary storage buffers, wherein the data stored in the destination location for the selected Jth strip is associated with a Kth logical address; and
writing data stored in the original location of the Jth strip to the destination location for the selected Jth strip, wherein the destination location for the selected Jth strip conforms to the final mapping function.

7. The method of claim 1, further comprising:
reading or writing data from a host device by identifying a logical address associated with the data being read or written;
determining the status value associated with the identified logical address;

in response to determining that the first status value is associated with the identified logical address, reading or writing that data at the location determined by applying the initial mapping function if the identified logical address is within the first N×B strips or the new storage device mapping function if the identified logical address is within the final M×B strips; and in response determining the second status value is associated with the identified logical address, reading or writing the data at the location determined by applying the identified logical address to the final mapping function.

8. The method of claim 1, further comprising:
creating a redundancy information coverage array, wherein the redundancy information coverage array includes:
an identification of each stripe in the virtual storage device; and
for each of the identified stripes, a first or second redundancy information value, wherein the first redundancy information value indicates that redundancy information for an associated stripe protects only those strips from the original N storage device units included in the associated stripe, and wherein the second redundancy information value indicates that redundancy information for an associated stripe protects all the strips of the N+M storage device units included in the associated stripe.

9. The method of claim 8, wherein the redundancy information coverage array is updated to protect all strips of the N+M storage device units whenever data is written to a strip contained on one of the M storage device units.

10. The method of claim 1, further comprising:
creating a data moved array; and
setting the status value associated with the first strip equal to the second status value.

11. A data storage system, comprising a plurality of storage device units comprising N original storage device units and M new storage device units;
a controller interconnected to the plurality of storage device units, including;
memory, including:
executable instructions for performing control and mapping functions;
a data moved array in which each available strip in a virtual storage device is identified, wherein the virtual storage device comprises the plurality of storage device units; and
a final mapping function for determining a location of a stripe of data in the virtual storage device, and
a redundancy information array in which each stripe in the data storage system is identified, and wherein for each stripe a redundancy information value is contained in the redundancy information coverage array indicating whether all of the strips associated this stripe are protected by redundancy information;
wherein for each of the identified strips a status value is contained in the data moved array indicating whether a location of each of the identified strips conforms to the final mapping function, wherein the status values initially indicate the first N strips and the last strip in the data moved array have a location that conforms to the final mapping function, wherein data in the M new storage device units is not required to be initialized.

12. The system of claim 11, further comprising:
an interface configured to interconnect the data storage system to a host device.

13. The system of claim 12, wherein each of the N and M storage device units includes B strips.

14. The system of claim 11, wherein the memory further includes:
a first temporary storage buffer; and
a second temporary storage buffer.

15. The system of claim 11, wherein the memory includes blocks located on a virtual storage device.

16. The system of claim 11, wherein the executable instructions for performing control and mapping functions include:
an initial mapping function for determining a location of a strip of data associated with a first status value in the data moved array on the N original storage device units included in the plurality of storage device units; and
a new storage device mapping function for determining a location of a strip of data associated with a first status value in the data moved array on the M new storage device units included in the plurality of storage device units, wherein the new storage device mapping function assigns logical addresses to the strips in the M storage device units, wherein the logical addresses assigned to the strips in the M storage device units are sequentially concatenated to a highest logical address in the initial mapping function, wherein each of the strips in the M storage device units are represented in the new storage device mapping function in the same order as in the M storage device units;
wherein the final mapping function determines the location of strips of data associated with a second status value in the data moved array on any of the N+M storage device units, wherein strips of data associated with the second status value have a different logical address in the final mapping function than at least one of the initial mapping function and the new storage device mapping function.

17. A method for restriping a virtual data storage device, comprising:
mapping N original storage device units according to an initial mapping function;
mapping M new storage device units according to a new disk mapping function, wherein the new disk mapping function maps the M new storage device units sequentially concatenated to the N original storage device units, wherein data in the M new storage device units is not required to be initialized, wherein each of the strips in the M new storage device units are represented in the new disk mapping function in the same order as in the M new storage device units;
associating a first status value or a second status value with each strip included in said N+M storage device units, wherein the first status value indicates that an associated strip needs to be relocated to conform to a final mapping function, wherein all strips except the first N strips of the initial mapping function and the last strip of the new storage device mapping function have the first status value; wherein the second status value indicates that an associated strip does not need to be relocated to conform to the final mapping function, wherein the first N strips of the initial mapping function and the last strip of the new disk mapping function have the second status value, wherein data in strips having the second status value are not copied elsewhere while expanding the virtual storage device, wherein strips having the second status value always maintain the second status value while expanding the virtual storage device;
identifying a first strip associated with the first status value, wherein the first strip associated with the first status value is the first strip in the new disk mapping function;

identifying a second strip occupying a destination location of the first strip according to the final mapping function;

moving the second strip to a first temporary storage buffer, wherein the first temporary storage buffer is separate from the virtual storage device; and moving the first strip to the destination location of the first strip.

18. The method of claim 17, further comprising:

associating the second status value with the first strip;

identifying a third strip occupying a destination location of the second strip according to the final mapping function;

moving the third strip to a second temporary storage buffer; wherein the second temporary storage buffer is separate from the virtual storage device; and moving the second strip from the first temporary storage buffer to the destination location of the second strip.

* * * * *